United States Patent [19]

Brienza et al.

[11] 3,909,584
[45] Sept. 30, 1975

[54] METHOD AND APPARATUS FOR DYNAMICALLY BALANCING A ROTATABLE OBJECT

[75] Inventors: Michael J. Brienza, Westport; David C. Smith, Glastonbury, both of Conn.

[73] Assignee: United Technologies Corporation, Hartford, Conn.

[22] Filed: June 12, 1974

[21] Appl. No.: 478,804

[52] U.S. Cl............. 219/121 LM; 219/121 L; 73/66
[51] Int. Cl.²......................................... B23K 27/00
[58] Field of Search ...... 219/121 LM, 121 L, 69 M, 219/69 P, 69 R; 74/573, 461–463; 264/22; 73/66, 460, 462, 466, 468, 469, 470, 473

[56] References Cited
UNITED STATES PATENTS

| | | | |
|---|---|---|---|
| 3,538,298 | 11/1970 | Duston et al. | 219/121 LM |
| 3,727,027 | 4/1973 | Kaiser et al. | 219/121 LM |
| 3,838,464 | 9/1974 | Doyle | 74/573 X |

Primary Examiner—J. V. Truhe
Assistant Examiner—G. R. Peterson
Attorney, Agent, or Firm—Anthony J. Criso

[57] ABSTRACT

Various apparatus and techniques used in the dynamic balancing of a rotating object are disclosed. A source of intense energy is directed onto a specially prepared object to initiate a sequence which results in the removal of a mass from the object, the mass of removed material being essentially independent of the amount of energy initiating the removal. In one embodiment, laser pulses selectively ignite pads of a combustible material which have been suitably located on the object; the amount of mass removed in this manner is a function of the size of the pads and the resulting balance correction is a function of the pad location with respect to the axis of rotation. Alternate schemes for removing quantitized masses from a rotating object with a triggering pulse are also disclosed.

7 Claims, 7 Drawing Figures

METHOD AND APPARATUS FOR DYNAMICALLY BALANCING A ROTATABLE OBJECT

BACKGROUND OF THE INVENTION

1. Field of Invention

The present invention relates to a technique for dynamically balancing a rotating object and more particularly to a dynamic balancing technique which uses a controllable source of energy to initiate a sequence whereby a predetermined mass is released from a precise location on the object.

2. Description of the Prior Art

The development of improved dynamic balancing is documented reasonably well in the patent art. Initially, the object to be balanced was rotated at a velocity which allowed any imbalance in the object to induce the associated vibration. The location of these imbalance loads was noted, rotation of the object was stopped, a suitable mass of the object was removed by drilling or other techniques, and the object was again rotated to determine if an appropriate amount of material had been removed. This process was repeated as many times as was necessary until the vibration was reduced to acceptable levels.

One of the more significant improvements made in this technique is reflected in the patent to Bevins et al, U.S. Pat. No. 2,322,561, Automatic Balancing of Rotating Bodies, in which material is removed from an object while it is rotating. An electric circuit with suitable feedback descriptive of the vibrational activity in the rotating object provides intermittent electric sparks to the region of imbalance on the rotating object. The action of the spark removes metal from the object and the process is continued until the rotating object is balanced. The ease with which the Bevins et al type technique can be applied in practical systems has been enhanced by contributions such as those provided in the patent to Laboulais, U.S. Pat. No. 2,346,975, Dynamic Balancing, which teaches improved devices for detecting and locating imbalance forces in a rotating body.

In U.S. Pat. No. 3,259,730, Balancing Method and Apparatus, Wehde et al teach the use of a laser or electron beam as an energy source for the removal of material from a rotating object. These energy sources can be extremely intense and very effective in the material removal process.

Subsequent improvements to the overall concept include the contribution by Popick et al, U.S. Pat. No. 3,472,998, Laser Apparatus for Removing Material from Rotating Objects, which is directed to the shaping of a laser pulse to decrease the surface area over which the pulse removes material from a rotating object. In U.S. Pat. No. 3,482,075, Laser Beam Apparatus for Dynamic Balancing of a Workpiece, Wilde discloses a system of optics which is interposed between the laser source and the rotating object for the purpose of directing the laser pulses to different locations on the rotating body during the balance process. In a similar sense, U.S. Pat. No. 3,499,136, Balancing Machine, to Nunnikhoven et al teach the use of laser energy in a dynamic balancing machine wherein wave analysis coordinates the laser trigger device to improve the material vaporization at the desired location on the rotating object.

A shortcoming which is common to all of the dynamic balancing art as exemplified by the patents described above is the limited amount of material removed from the rotating object by each pulse of incident energy. The transition from an electric arc to an electron beam and then to laser sources illustrates a trend, however, the amount of material removed even with a laser pulse is relatively small. Each output pulse from a typical laser system contains approximately one joule of energy although this can vary considerably over a range of about four orders of magnitude. The amount of material removed by a pulsed laser source is relatively insensitive to the composition of the material and has been determined to be approximately one microgram per joule for a pulse of short duration and 200 micrograms per joule for a pulse of long duration. Myer deals with the problem in U.S. Pat. No. 3,663,795, Rotor Balancer, and discloses a device which keeps the focused energy from the laser on the same location of the rotating object until the amount of material required to balance the object has been removed by vaporization. A limitation of Myer as well as the rest of the art is the inescapable correlation between the amount of energy that can be applied to a rotating object in one pulse and the limited amount of material which can be removed from the object by each energy pulse.

SUMMARY OF THE INVENTION

A primary object of the present invention is to dynamically balance a rotatable object.

According to the present invention, an object having a plurality of sites of severable masses is rotated, and a pulsed source of triggering energy is directed toward the object; the triggering energy is absorbed by the object causing masses at select sites to become separated from the object in a controlled sequence which is correlated to the dynamic balance requirements of the object.

One of the primary advantages of the present invention is the relatively large change in the mass of the rotating object which is produced per unit of triggering energy. This is possible since the entire mass which is removed from the object does not undergo a phase change such as melting or vaporization; the pulsed source of triggering energy merely interrupts a restraining structure or initiates a chemical reaction and the severable mass separates itself from the object under the influence of centrifugal force or combustion. The technique disclosed is relatively quick and inexpensive and results in a small amount of recast material for the amount of mass removed from the object.

The mass change to the rotating object occurs in increments although the mass of each increment can be varied considerably and a mixture of various increments can be applied. The material which is removed from the object is often different than the parent material and the removal process can consist of burning, flowing of a quantitized mass from an enclosed site, or severing a quantitized mass as a unit.

The foregoing and other objects, features and advantages of the present invention will become more apparent in the light of the following detailed description of preferred embodiments thereof as illustrated in the accompanying drawing.

DESCRIPTION OF A PREFERRED EMBODIMENT

Figure 1:
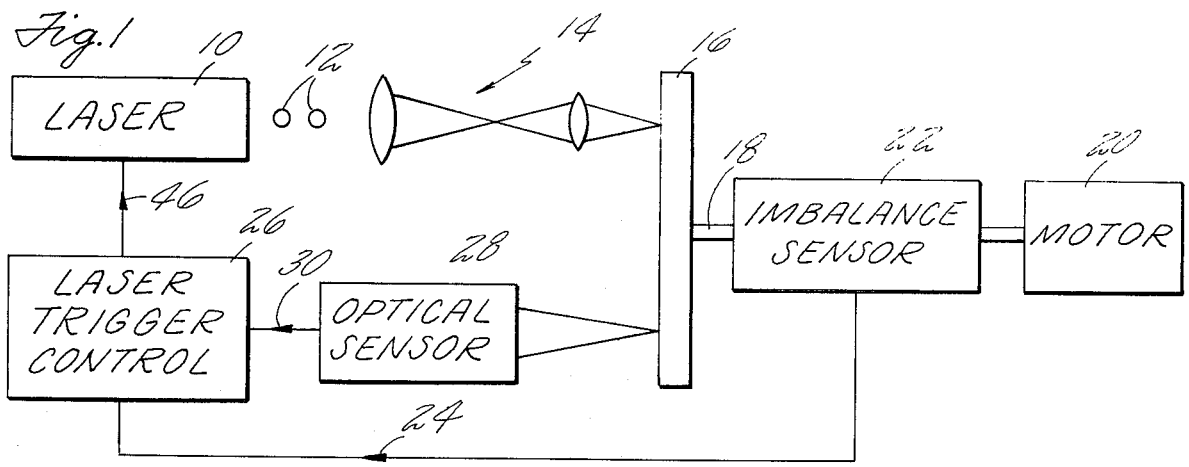
FIG. 1 is a schematic diagram of an overall system for the dynamic balancing of a rotatable object in accordance with the present invention.

A typical system illustrating an application of the present invention is shown schematically in FIG. 1. A laser 10 provides pulses 12 of output energy which are focused by a telescope 14 onto an object 16. The object is mounted on a shaft 18 and is rotated by an electric motor 20. An imbalance sensor 22 which is mounted on the shaft provides an imbalance signal 24 to a laser trigger control 26. An optical sensor 28 provides a position signal 30 to the laser trigger and is described more fully below.

Figure 2:
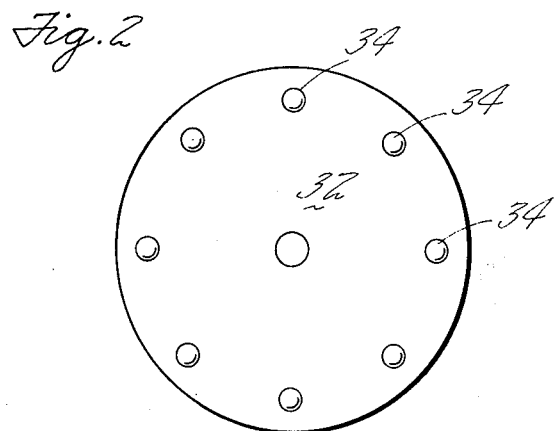
FIG. 2 is a schematic elevation view of an arbitrary object having ignitable materials embedded in the surface.
Figure 3:
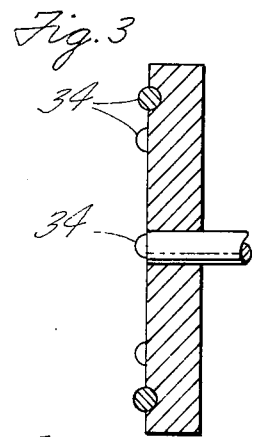
FIG. 3 is a vertical section through the object shown in FIG. 2.

The principal teaching which is common to all the various embodiments of the present invention is the use of a highly intense pulse of radiation such as one available from a laser to initiate the removal of a predetermined mass from a rotating object, the amount of mass removed being essentially independent of the amount of energy in the initiating pulse. Various schemes such as those which are shown in the drawing, permit this accomplishment. A rotatable object 32 having pads 34 of a combustible material embedded in or adhered to its surface is shown in FIGS. 2 and 3. The mass of the pads is varied considerably depending upon the balancing considerations anticipated for the object; also, the pads are varied in shape and thickness and take on other forms such as pellets or rods. In many applications, the pads comprise a material having a high ignition temperature such as magnesium and although the material is in fact combustible, the application of an extremely intense energy source such as a laser pulse is required to initiate the combustion. The combustible pads shown in FIGS. 2 and 3 are formed integral with the object, an embodiment which may not always be convenient or possible. Alternatively, a composite tape containing suitably located combustible materials is prepared and bonded to the surface of the object.

Figure 4:
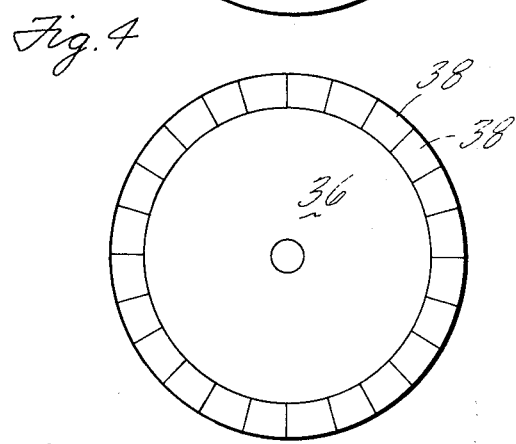
FIG. 4 is a schematic elevation view of an arbitrary object with sites containing flowable material.
Figure 5:
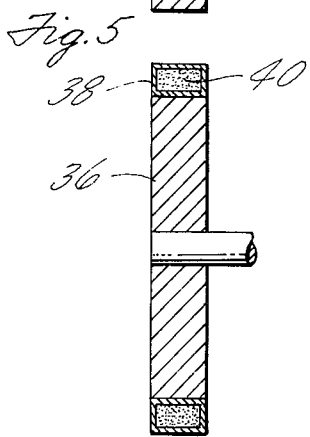
FIG. 5 is a vertical section through the object shown in FIG. 4.

One variation to the apparatus using combustible materials requires a pocketed object 36 as is shown in FIGS. 4 and 5. Individual compartments 38 are formed within the object 36 and each compartment is filled with a flowable material 40 such as sand, powder or a liquid which is contained internal to the object. To release the flowable material, the pocketed object is rotated and the integrity of the compartment is interrupted by the application of pulses of energy such as those provided by a laser. The material is then able to flow out of the compartment.

Figure 6:
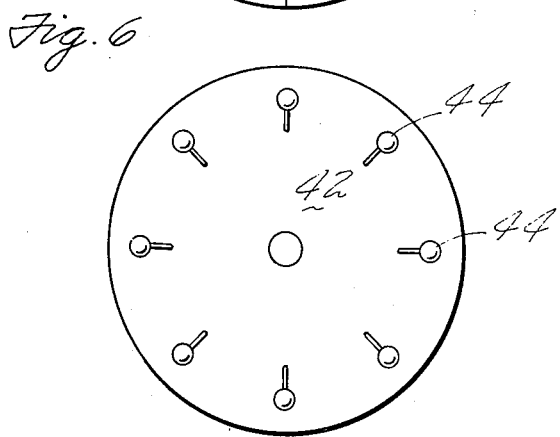
FIG. 6 is a schematic elevation view of an object showing severable masses attached to the surface.
Figure 7:
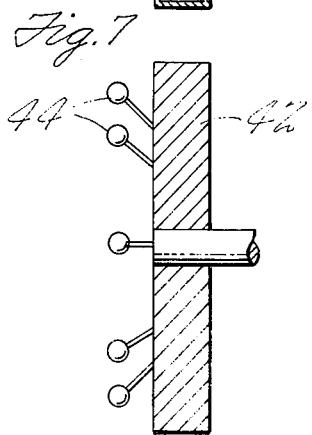
FIG. 7 is a vertical section through the object shown in FIG. 6.

Another embodiment of the invention involves the use of a weighted object 42 as is shown in FIGS. 6 and 7. Balance weights 44 are attached to the object by connectors 46 which have a small cross sectional area. With suitable alignment of the laser pulses, a connector can be severed and a relatively large balance weight separated from the object by the application of a relatively small amount of incident energy.

In the practice of the present invention, the object 16 is rotated in a suitable rig by the electric motor 20. Any weight distributed asymmetrically about the axis of rotation of the object induces a side loading on the shaft 18 which is detected by the vibration sensor and transmitted to the laser trigger as an electrical impulse, the imbalance signal 24. The optical sensor 28 is a standard transmission and receiver device used to locate target sites on the object. When the object is rotated at the desired speed, the optical sensor identifies the target areas on the object and provides an electrical signal with a suitable time delay, the position signal 30, to the laser trigger. The latter activates the laser with a trigger signal 46 to produce an output pulse or pulses suitably sequenced to arrive at the target site on the object to cause the intended target to become separated from the object. The sequence of sensing an imbalance on the object and activating the laser to produce a triggering pulse of energy which causes a desired mass to become separated from the object is repeated until an acceptable condition of balance is achieved. The apparatus and techniques described herein are especially suited to balancing of electric motors, turbines, flywheels, axles, wheels and the like.

This technique is preferred over the standard dynamic balancing with lasers because the pulses of output energy from the laser contain relatively low power and thus avoid the large scale discoloration and recast zone inherent in the higher power burn off techniques.

The targets on the object are easily identifiable by the distinctive finish provided as necessary on the surface with paint, dimpling and similar techniques. The sensor 28 is typically a standard amplitude sensitive optical device which responds to the light reflected from the object.

The larger high power lasers such as many of the carbon dioxide systems are not necessary in the practice of this invention. The laser is selected from the group which is capable of providing energy pulses of a few joules. In effect, the selection is from one of the relatively small Q-switched systems such as Nd:YAG, Nd:Glass and ruby which provide output pulses twenty to fifty nanoseconds in duration. With a pulse duration in this range, the object is for all intents and purposes motionless during the balancing thereby allowing extremely accurate targeting of the pulses on the object.

Often an extremely fine dynamic balance is required and cannot be achieved simply by igniting one of the combustible pads as shown in FIG. 2 or emptying one of the compartments as shown in FIG. 6. Under these circumstances any of several refinements can be applied to the present invention. For example, all the embodiments shown in the drawing has the severable masses distributed in a uniform fashion along the line which is equidistant from the center of rotation of the object. These conditions are convenient for the purposes of explanation but in practice the severable masses are sometimes selectively positioned in a pattern which locates the masses at different radii from the center of rotation. Then a wide range of balance requirements can be satisfied by removing a given amount of mass from the proper region of the object at a selectable radius. The concept is made even more flexible by mixing the magnitude of the severable masses attached to the object. The actual number and location of detachable masses is a function of the size of the object and the degree of balance to be satisfied.

Another variation to the basic balancing scheme involves removing the relatively large fixed masses with the triggering pulses of laser energy so that the object achieves an intermediate condition of balance approximating the final condition, and then the laser pulse is used in a more conventional manner such as the scheme taught generally by Popick et al in U.S. Pat. No. 3,472,998 to achieve the finer ultimate balance desired. A highly precise balance such as that required in laser gyroscopes is possible in this manner.

Each of the various embodiments shown and discussed above require that the object be of special manufacture in order to accommodate the balancing technique taught herein. Depending upon the physical features of the object to be balanced and its application, the choice between combustible materials, flowable materials or detachable weights is arbitrary in some instances and is determined by the particular application in others; ultimately the application of the balanced object determines which if any of the suggested embodiments are practical. For example, for an application wherein the balanced object is exposed to strong chemicals, the use of composite tape to attach the severable masses to the object is probably best avoided. Similarly, the use of protruding balance weights such as those shown in FIGS. 6 and 7 are avoided when the balanced object is exposed to impact by foreign objects during operation, or in applications in which the wind resistance produced by the weights during rotation is significant.

For the case in which a flowable material is loaded into individual compartments such as those shown in FIGS. 4 and 5, one variation to the described systems is to heat the object after the balancing has been completed in order to solidify the flowable materials in the unruptured compartments. For example, when the flowable material is a mixture of a curable epoxy resin, the object is subjected to a heat treatment after the balancing procedure. During the heat treatment the flowable material solidifies and becomes integral with the object.

Although this invention has been shown and described with respect to preferred embodiments thereof, those skilled in the art should recognize that various other changes and omissions in the form and detail thereof may be made therein without departing from the spirit and scope of the invention.

Having thus described typical embodiments of our invention, that which we claim as new and desire to secure by Letters Patent of the United States is:

1. In a system for dynamically balancing an object by the selective removal of material from the object through the impingement of pulses of energy on the object, apparatus comprising:
a plurality of removable material concentrations which are supported by the object and located at preselected sites, each concentration being disposed to be separable from the object by an amount of energy which is independent of the amount of energy needed to vaporize said concentration;
drive means for rotating the object about an axis of rotation;
force sensing means for
determining the magnitude and direction of any net imbalance force which is produced in the object during rotation, and
providing an imbalance signal representative of the magnitude and direction of the net imbalance force;
power generation means for providing ouput pulses of energy directed to impinge on the object and cause separation of a removable material concentration from the object; and
means responsive to the imbalance signal for controlling the location on the object at which the output pulses impinge whereby the pulses are directed to those preselected sites which cause removal of material concentrations until the imbalance force is essentially eliminated.

2. The invention according to claim 1 further including optical sensing means for determining the precise location on the object of each site of removable material and for providing a site location electrical signal to the control means.

3. The invention according to claim 1 wherein the removable material concentration is combustible and ignitable by a pulse of energy from the power generating means.

4. The invention according to claim 1 wherein the removable concentration has the same material composition as the object.

5. The invention according to claim 1 wherein the power generation means is a laser.

6. The invention according to claim 1 wherein the mass of the removable material concentrations is different from one another of the preselected sites.

7. The method of dynamically balancing a rotatable object by the selective removal of material from the object through the impingement of pulses of energy on the object, including the steps of:
supporting a plurality of detachable material concentrations with the surface of the object;
spinning the object about an axis of rotation;
sensing the magnitude and direction of the net imbalance force occurring in the object to produce imbalance signals;
providing an energy source capable of producing an output of energy pulses;
producing energy pulses in response to the imbalance signals; and
separating a detachable material concentration from the object by the impingement of energy pulses in an amount which is independent of the amount of energy required to vaporize said detachable concentration.

* * * * *